United States Patent [19]

Avins

[11] 3,984,865

[45] Oct. 5, 1976

[54] TRANSIENT SUPPRESSION IN TELEVISION VIDEO SYSTEMS

[75] Inventor: Jack Avins, Princeton, N.J.

[73] Assignee: RCA Corporation, New York, N.Y.

[22] Filed: Mar. 26, 1975

[21] Appl. No.: 562,189

[52] U.S. Cl. .......................... 358/36; 178/DIG. 12; 358/39
[51] Int. Cl.² ...................... H04N 9/02; H04N 5/14
[58] Field of Search .......................... 358/36, 39; 178/DIG. 12, 7.3 R, DIG. 19, DIG. 25; 333/28 R, 707

[56] References Cited
UNITED STATES PATENTS

| | | | |
|---|---|---|---|
| 2,851,522 | 9/1958 | Hollywood | 333/70 T X |
| 3,011,018 | 11/1961 | Sullivan | 333/70 T X |
| 3,030,440 | 4/1962 | Schade, Sr. | 333/70 T X |
| 3,535,443 | 10/1970 | Rieke | 178/DIG. 34 |
| 3,778,543 | 12/1973 | Lowry | 358/37 |
| 3,804,980 | 4/1974 | Lowry | 178/DIG. 34 |
| 3,859,544 | 1/1975 | Nero | 178/DIG. 34 |
| 3,938,181 | 2/1976 | Avins | 178/7.3 R X |

OTHER PUBLICATIONS

McMann, Jr., et al., "Improved Signal Processing Techniques for Color Television Broadcasting"; Journal of the SMPTE, 3-1968, pp. 221-228.

Primary Examiner—Robert L. Griffin
Assistant Examiner—Mitchell Saffian
Attorney, Agent, or Firm—Eugene M. Whitacre; Peter M. Emanuel; Ronald H. Kurdyla

[57] ABSTRACT

In a television signal processing system, broadband means responsive to television video signals are provided to derive a relatively broadband signal including signal components in a frequency range between zero Hertz and a frequency $f$. Narrowband means also responsive to the television video signals are provided to derive a relatively narrowband signal having a peak amplitude response at a frequency between zero Hertz and approximately $f$ and a relatively lower response at frequencies of zero Hertz and approximately $f$. Thresholding means responsive to the narrowband signal are provided to inhibit translation of signal portions of the narrowband signal above a predetermined threshold. The amplitude inhibited narrowband signal is combined with the broadband signal to provide an output signal having relatively accentuated high frequency components and relatively suppressed noise components.

In an illustrative embodiment, delayed signals, developed at taps of a transversal equalizer included in the luminance channel of a television receiver, are combined to provide a relatively broadband signal and a relatively narrowband signal, the latter including relatively high frequency luminance signal components. The narrowband signal is processed to inhibit translation of signal portions above a predetermined threshold. The processed narrowband signal and the broadband signal are combined to provide a signal wherein relatively high frequency luminance signal components have been accentuated, chrominance signal components have been attenuated and transient noise, which might otherwise result in undesirable spots in a reproduced image, have been substantially reduced or suppressed.

15 Claims, 6 Drawing Figures

TRANSIENT SUPPRESSION IN TELEVISION VIDEO SYSTEMS

The present invention is directed to apparatus for reducing or suppressing noise in television video signal processing systems and is particularly directed to apparatus for reducing or suppressing transient noise in television video signal processing systems having provisions for improved picture quality.

The suppression of undesirable transient noise in television video signal processing systems has long been a problem, particularly in television video signal processing systems utilizing circuitry to relatively accentuate or peak relatively high frequency video signal components, e.g., relatively high frequency luminance signal components, to improve the sharpness or crispness of a reproduced image.

The presence of transient noise in the luminance signal portion of a video signal is manifested by the presence of spots in a reproduced image which may be disconcerting to a viewer. Although transient noise may have amplitudes corresponding to various gray levels of a reproduced image, transient noise whose amplitude is near the white is particularly undesirable since it results in white spots which are readily discernable by a viewer. Transient noise is undesirable in signals corresponding either to white or black areas of a reproduced image. For example, transient noise having an amplitude near the white level in a signal corresponding to a black background produces highly visible spots. In a white signal, white transients may cause spot defocussing, excessive beam current and signal rectification in a picture tube utilized to reproduce the image.

Transient noise may result from a variety of sources. For example, in a television receiver the bandpass filter circuitry of the intermediate frequency (I.F.) portion may ring, i.e., generate a burst of energy in the center region of the bandpass, in response to an impulse signal. Because the carriers of the video signal components are offset from the center frequency of the I.F. bandpass filter circuitry, the ringing and a carrier may beat to form transient noise in an upper frequency range of the luminance signal component in a region around 1.8 MHz. This transient noise is particularly undesirable since it resides in that frequency range of the luminance signal which may be selectively amplified to improve the crispness or sharpness of a reproduced image. Thus, suppression of transient noise may be difficult without adversely affecting the picture quality.

Transient noise is particularly severe in receivers utilizing an I.F. amplifier system including a synchronous detector rather than an envelope detector because, whereas an envelope detector rectifies the composite signal envelope to provide transients in one direction, typically in the black direction, a synchronous detector symmetrically reproduces the I.F. ringing so that both white and black spots are produced. Although both black and white spots are objectionable, it has been observed that black spots are less disconcerting to a viewer than are white spots.

Various circuits are known for inhibiting noise. Circuits are known for "clipping off" signal and noise portions above a predetermined threshold. One such circuit is described in U.S. Pat. No. 2,834,884, entitled "Electric Wave Amplitude Clipping Circuit", issued to R. W. Sonnenfeldt on May 13, 1958 and assigned to the same assignee as the present invention. Circuits are also known for developing an auxiliary signal from a main signal which has a suitable amplitude and time-delay with respect to noise in the main signal to cancel the noise when combined with the main signal. Circuits in which a noise cancellation signal is developed from components of the television video signal in a predetermined frequency range are described in U.S. Pat. No. 2,854,508, entitled "Circuit Arrangement for Use in Television Receivers for Separating Interference Signals", issued to P. J. H. Janssen on Sept. 30, 1958, and U.S. Pat. No. 2,885,474, entitled "Circuit Arrangement for Use in Television Receivers and Intended for Filtering Out Noise Signals", issued to P. J. H. Janssen, et al. on May 5, 1959. Circuits, sometimes called "spotter" or "noise inverter" circuits, are also known for, in essence, inverting a portion of a signal above a predetermined threshold in order to inhibit transient noise. One such circuit is described in U.S. Pat. No. 3,862,361, entitled "Video Amplifier Circuit for Use with Synchronous Detectors", issued to J. B. George on Jan. 21, 1975.

It is desirable that the portion of the television video signal processing apparatus directed at suppressing noise does not adversely affect the operation of other portions of the signal processing apparatus. As previously mentioned, it is desirable that the noise suppression circuit does not adversely interfere with portions of the signal processing apparatus arranged to crispen the image by accentuating relatively high frequency components of the luminance signal. It is also desirable that the noise suppression circuitry does not unnecessarily operate on signal components, i.e., relatively low frequency luminance signal component signals in which there are relatively few noise transient components. In this manner, one can avoid introducing undesirable nonlinearities linearities in the gray scale of the image associated with the relatively low frequency luminance components.

It is known that a desired amplitude or phase characteristic (or both) as a function of frequency may be formed substantially without introducing phase nonlinearity or phase distortion by means of an apparatus wherein delayed signals generated at terminals (usually referred to as taps) along a delay line or like device are combined in a predetermined manner. Such apparatus, sometimes called a "transversal equalizer" or "transversal filter", is generally described in U.S. Pat. No. 2,263,376, entitled "Electric Wave Filter, or the Like", issued to A. D. Blumlein et al., on Nov. 18, 1941; an article entitled "Transversal Filters", by H. E. Kallman, appearing in the *Proceedings of the I.R.E.*, Volume 28, Number 7, pages 302–310, July 1940; an article entitled, "Selectivity and Transient Response Synthesis", by R. W. Sonnenfeldt, appearing in *I.R.E. Transactions on Broadcast and Television Receivers*, Volume BTR-1, Number 3, pages 1–8, July 1955; and an article entitled, "A Transversal Equalizer for Television Circuits", by R. V. Sperry and D. Surenian, appearing in Bell System Technical Journal, Volume 39, Number 2, pages 405–422, March 1960.

Transversal equalizers are generally useful in a variety of applications in the signal processing field. For instance, such apparatus may be found useful in horizontal and vertical aperture beam correction, as is described in U.S. Pat. No. 2,759,044, entitled "Beam Aperture Correction in Horizontal and Vertical Direction", issued to B. M. Oliver on Aug. 14, 1956.

In a co-pending patent application Ser. No. 486,241, now abandoned entitled, "Television Signal Processing Apparatus", of Joseph Peter Bingham, filed July 5, 1974, and assigned to the same assignee as the present invention, transversal equalizers useful in television signal processing apparatus are described for accentuating the amplitudes of relatively high frequency components of the luminance signal portions of a video signal while attenuating the amplitudes of chrominance or sound portions of the video signal or both.

The present invention is directed to an apparatus useful for suppressing transient noise generated. In accordance with the present invention, narrowband means, responsive to television video signals, provide a relatively narrowband high attenuation at DC and at a frequency $f$ where it is desired to attenuate the video signals, such as the chrominance or sound subcarrier frequency, and a peak amplitude at a frequency between 0 and $f$ where it is desired to accentuate the video signals, such as in the relatively high frequency range of the luminance signals. Thresholding means inhibit amplitude portions of the narrowband signal above a predetermined threshold. Broadband means, responsive to the television signals, provide a broadband signal including signal components in a frequency range between DC and $f$. The broadband signal is combined with the amplitude inhibited narrowband signal to provide an output signal relatively free of transient noise wherein, for example, chrominance or sound signals have been attenuated and relatively high frequency luminance signals have been accentuated.

In accordance with another feature of the invention, a signal delaying means, responsive to the television signals, includes a plurality of terminals or taps for developing delayed signals. At least one of the delayed signals are utilized to derive the broadband signal. Two other of the delayed signals having an average time delay approximately equal to the time delay of the first delayed signal are combined with the broadband signal to derive the narrowband signal.

These and other aspects of the present invention will be best understood by the following detailed description in conjunction with the accompanying drawing in which.

Figure 1:
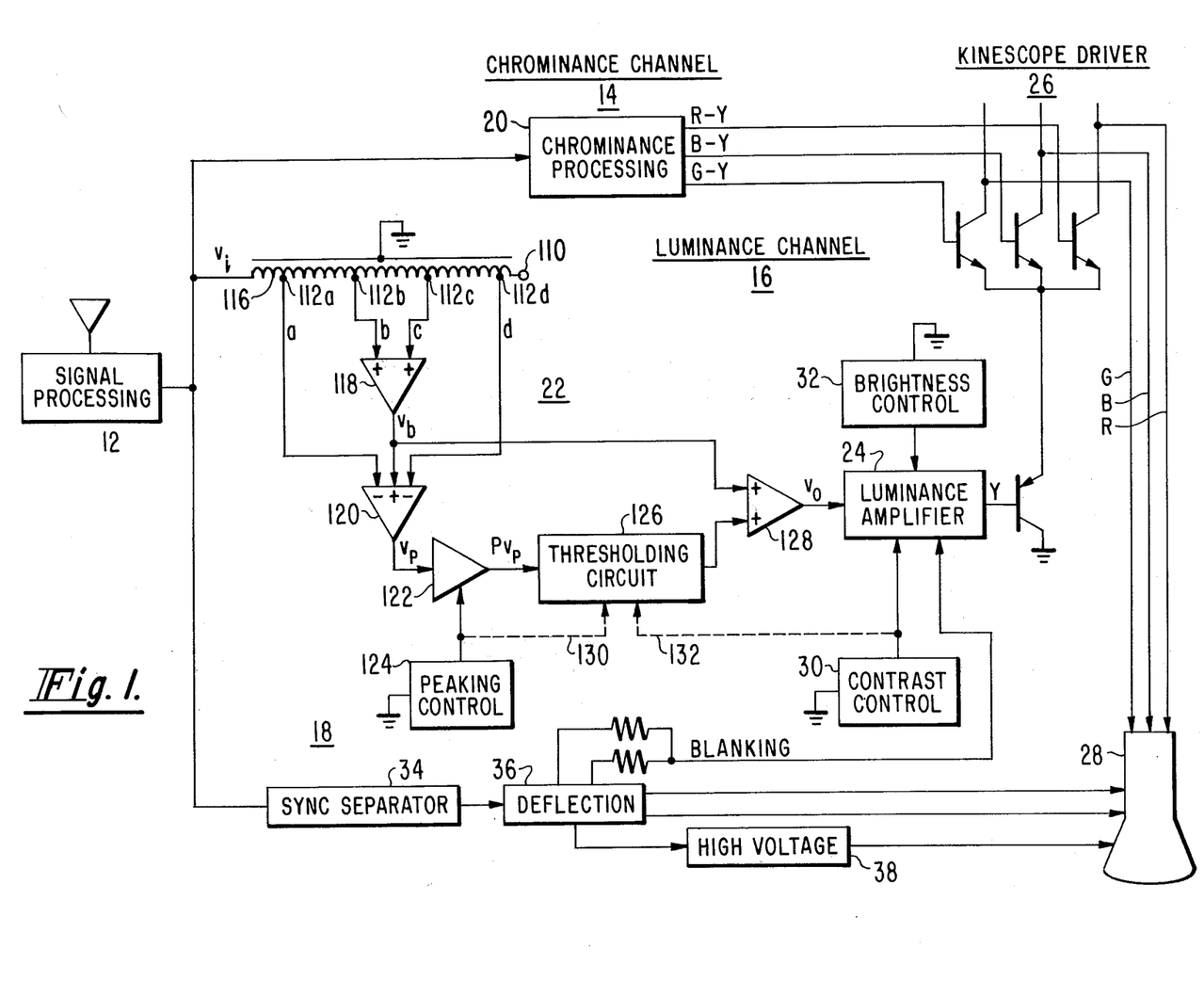
FIG. 1 shows, partially in block diagram form and partially in schematic form, the general arrangement of a color television receiver employing an embodiment of the present invention.

Referring now to FIG. 1, the general arrangement of a color television receiver employing the present invention includes a signal processing unit 12 responsive to radio frequency (RF) television signals received by an antenna, for generating, by means of suitable intermediate frequency circuits (not shown) and detection circuits (not shown), a composite video signal comprising chrominance, luminance, sound and synchronizing signals. Signal processing unit 12 may, for example, include a synchronous detector of either the exalted carrier or product detector type well-known in the art. A synchronous detector of the exalted carrier type suitable for use in signal processing circuit 12 is described in U.S. Pat. No. 3,812,289, entitled "Television Receiver Using Synchronous Video Detection", issued to the same inventor as the present invention on May 21, 1974 and assigned to the same assignee as the present invention. The output of signal processing unit 12 is coupled to a chrominance channel 14, a luminance channel 16, a channel 18 for processing synchronization (sync) pulses, and a channel (not shown) for processing sound signals.

Chrominance channel 14 includes a chrominance processing unit 20 which serves to derive color signals, e.g., R-Y, B-Y and G-Y color difference signals, from the chrominance portion of the composite video signal.

A luminance signal processing unit 22 is included in luminance channel 16 and serves to attenuate undesirable signals present in luminance channel 16 such as chrominance or sound signals or both, while accentuating or peaking the amplitudes of relatively high frequency components of the luminance signals to improve the transient response and fine detail resolution of the television receiver. Luminance signal processing unit 22 also includes provisions for reducing or suppressing relatively high frequency components having amplitudes above a predetermined threshold to suppress transient interference or noise. Furthermore, luminance signal processing unit 22 may also serve to equalize the time delays of the signals processed in chrominance channel 14 and luminance channel 16.

The output of luminance signal processing unit 22 is coupled to a further luminance amplifier 24 which serves to amplify and otherwise process the output signals of luminance signal processing unit 22 to produce an output signal Y of luminance channel 16.

The Y output signal of luminance channel 16 and the R-Y, G-Y and B-Y color difference output signals of chrominance channel 14 are coupled to a kinescope driver 26 where they are matrixed to form R, G and B color signals. The R, G and B color signals drive a kinescope 28. Alternatively, the luminance and color difference signals may be matrixed in kinescope 28 as is known.

A contrast control unit 30 is coupled to luminance amplifier 24 to control the amplitude of the luminance signals and thereby control the contrast of the images produced by kinescope 28. Contrast control unit 30 may also be coupled to chrominance processing unit 20 to control the amplitude of the chrominance signals and thereby control the saturation of the images produced by kinescope 28. A brightness control unit 32 also is coupled to luminance amplifier 38 to control the DC content of the luminance signals and thereby control the brightness of the images produced by kinescope 28. Suitable contrast and brightness control arrangements are described in U.S. Pat. No. 3,804,981, entitled "Brightness Control", by the same inventor as the present invention, issued Apr. 16, 1974 and assigned to the same assignee as the present invention.

Channel 18 includes sync separator 34 which serves to separate horizontal and vertical synchronization pulses from the video signal. The synchronization pulses are coupled from the sync separator 34 to deflection circuit 36. Deflection circuit 36 is coupled to kinescope 28 and to a high voltage unit 38 to control the deflection or sweep of an electron beam in kinescope 28. Deflection circuit 36 also generates blanking signals which are coupled to luminance amplifier 24 to inhibit the output of luminance amplifier 24 during the horizontal and vertical retrace periods to insure cutoff of kinescope 28 during these respective periods.

The general circuit arrangement shown in FIG. 1 is suitable for use in a color television receiver of the type shown, for example, in RCA Color Television Service Data 1973 Number C-8 (a CTC-68 type receiver), published by RCA Corporation, Indianapolis, Indiana.

Luminance signal processing unit 22 includes signal delaying means 110, shown as a delay line, responsive to a video signal $v_i$, and a plurality of terminals or taps 112a, 112b, 112c, and 112d coupled to delay means 110 at successive points. The combination of signal delaying means 110 and taps 112a, 112b, 112c and 112d is sometimes referred to as a tapped delay line. Although delay means 110 is shown as an inductive or coil type of delay line, it may be formed by any other suitable device for delaying a video signal such as an array of charge coupled devices (CCD's) or charge transfer devices. Although taps 112a, 112b, 112c and 112d are shown as being directly connected to delay line 110, they may be coupled to the delay in any other suitable manner providing for signal coupling such as by capacitive coupling or the like.

Taps 112a, 112b, 112c and 112d are coupled to delay line 110 at spaced intervals to develop respective delayed video signals a, b, c and d delayed in time in relation to $v_i$ by respective time intervals $T_D$, $T_D+T_1$, $T_D+T_1+T_2$, and $T_D+T_1+T_2+T_3$. A portion 116 of delay line 110 having a time delay interval $T_D$ is provided prior to tap 112a and is selected to equalize the time delays of the signals processed in the receiver's luminance and chrominance channels. For the purpose of equalizing the time delays of the signals processed in the chrominance and the luminance channels, it is desirable that the sum of $T_D$, $T_1$ and $(1/2)(T_2)$ equal the difference between the time delays of the signals processed in the chrominance and luminance channels. In addition, it should be noted that a signal resulting from the combination of signals developed at taps symmetrically disposed around a given point of a delay line may be considered to have a time delay equal to the average of the time delays of the combined signals. Therefore, if taps 112a, 112b, 112c and 112d are symmetrically disposed around the point of delay line 110 midway between taps 112a and 112d, the output signal derived by combining signals developed at taps 112a, 112b, 112c and 112d also will have a time delay which is equal to the time delay required to equalize the time delays of the signals processed in the chrominance and luminance channels.

Delayed signals b and c are coupled to a summing circuit 118 where they are algebraically added to produce a relatively broadband signal $v_b$. As will be seen, the bandwidth of luminance signal processing unit 22 is primarily determined by $v_b$. Summing circuit 118 may be formed by any suitable circuit for algebraically summing signals such as an operational amplifier, a resistive matrix or the like. Summing circuit 118 may also serve to modify the amplitude of (i.e., weight) b and c prior to their addition.

Delayed signals a and d and $v_b$ are coupled to a summing circuit 120 which serves to algebraically subtract a and d from $v_b$ to produce a relatively narrowband signal $v_p$. Summing circuit 120 may be formed in a similar manner as summing circuit 118 and may include provisions for modifying the amplitude of (i.e., weight) a, d and $v_b$ prior to subtraction. As will be seen, the peaking characteristics of signal processing unit 22 are primarily determined by $v_p$.

The output signal of summing circuit 120, $v_p$, is coupled to variable gain device 122 which serves to modify the amplitude of $v_p$ to produce a signal $Pv_p$, where P is the gain (or attenuation) factor of variable gain device 122. Variable gain device 122, which, for example, may be formed by a variable gain amplifier, is arranged to produce a range of gains extending from values less than unity to values greater than unity in response to a control signal developed by peaking control circuit 124. Peaking control circuit 124 may, for example, be formed of any suitable device for providing a control signal in response to manual adjustment. Alternatively, peaking control circuit 124 may also be arranged to derive a control signal from a portion of the composite video signal indicative of picture quality such as is described in co-pending application Ser. No. 516,491, filed Oct. 21, 1974 by Joseph Peter Bingham and assigned to the same assignee as the present invention.

The output of variable gain device 122, $Pv_p$, is coupled to a thresholding circuit 126 which serves to reduce or inhibit portions of $Pv_p$ above a predetermined threshold in order to suppress transient noise. Thresholding circuit 126 may, for example, comprise a clipping or limiting circuit to provide a modified form of $Pv_p$ wherein transient portions above a predetermined threshold are "clipped" off. A suitable clipping circuit is shown as part of the circuit implementation of luminance signal processing unit 22 in FIG. 3. Thresholding circuit 126 may also, for example, comprise a noise inverter or "spotter" circuit to provide a modified form of $Pv_p$ wherein transient portions above a predetermined threshold have, in essence, been inverted. Such a circuit is described in the George patent previously mentioned.

Figure 2:
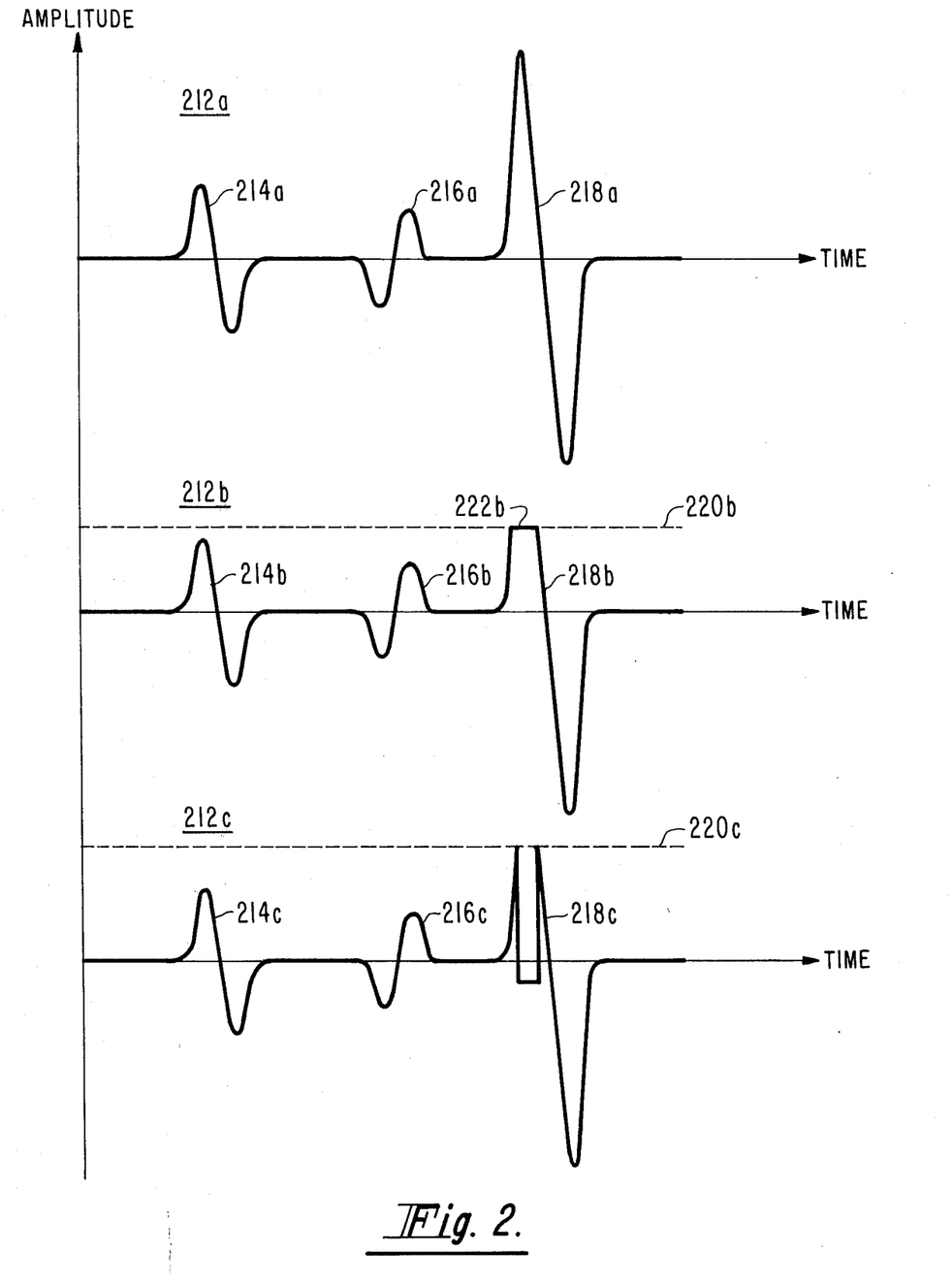
FIG. 2 shows graphical representations of various time domain waveforms associated with the embodiment shown in FIG. 1.

The operation of thresholding circuit 126 for various configurations is demonstrated in FIG. 2. In FIG. 2 there is shown a graphical representation 212a of $Pv_p$ including portions which correspond to a white-to-black transition 214a, a black-to-white transition 216a and a portion 218a corresponding to transient noise which may be generated, for example, by ringing in the I.F. portion of signal processing unit 12 of FIG. 1. In FIG. 2, signal portions above the TIME axis correspond to transitions toward white while signal portions below the TIME axis correspond to transitions toward black. It is noted that $Pv_p$ is a relatively narrowband signal containing only relatively high frequency components of the luminance signal. The operation of signal processing unit 126 to provide the relatively high frequency narrowband amplitude versus frequency transfer characteristics associated with $Pv_p$ will subsequently be explained with reference to FIG. 3.

Waveform 212b corresponds to an amplitude inhibited form of $Pv_p$ provided when thresholding circuit 126 of FIG. 1 is arranged as a clipping circuit. The portions of waveform 212b above a predetermined threshold 220b have been "clipped off" to form a flat portion 222b. Only the portions of $Pv_p$ above a predetermined threshold 220b have been altered.

Waveform 212c corresponds to an amplitude inhibited form of $Pv_p$ provided when thresholding circuit 126 of FIG. 1 is arranged as a noise inverter or spotter circuit. The portions of waveform 212c above a predetermined threshold 220c have been, in essence, inverted. Only the portions of $Pv_p$ above predetermined threshold 220c have been altered.

Although the operation of thresholding circuit 126 has been described as inhibiting signal portions of $Pv_p$ which extend beyond a predetermined threshold in the white direction, it may be arranged to inhibit signal portions which extend below a predetermined threshold in the black direction or it may be arranged to inhibit transient noise in both the white and black directions.

The transient-inhibited forms of $Pv_p$ and $v_b$ are coupled to a summing circuit 128. Summing circuit 128 is similar to summing circuits 118 and 120 and serves to algebraically add the transient-inhibited forms of $Pv_p$ and $v_b$ to produce an output signal $v_o$ of luminance signal processing unit 22. The predetermined threshold of thresholding circuit 126 also may be controlled in accordance with the amplitude of $Pv_p$. For this purpose, the control signal developed by peaking control unit 124 may be coupled, as is indicated by dotted line 130, to thresholding circuit 126 to control this threshold in direct relationship to the amplitude of $Pv_p$. It is desirable for this purpose that the signal derived by peaking control unit 124 be a DC signal. Similarly, as is indicated by dotted line 132, the control signal derived by contrast control 30 (desirably in DC form) may be coupled to thresholding circuit 126 to control its threshold in direct relationship to the amplitude of luminance signal Y.

In order to facilitate an understanding of the operation of luminance signal processing unit 22 of FIG. 1, the amplitude versus frequency transfer characteristics of a tapped delay line or similar device will be discussed. The amplitude versus frequency transfer characteristic of a portion of a delay line which contributes a time delay t to applied signals may be expressed as a coefficient which varies exponentially as a function of frequency, i.e., $e^{-j\omega t}$, e being the natural logarithm base and being a unit of frequency. The amplitude versus frequency transfer characteristic associated with a signal produced by algebraically adding two such signals generated at respective taps symmetrically located about a reference point (i.e., $+t$ and $-t$) varies as a cosine function.

By way of example, it is assumed that taps 112a, 112d, 112b and 112c are located symmetrically around the point of delay line 110 midway between taps 112a and 112d and that the time intervals $T_1$, $T_2$ and $T_3$ each are equal to $1/2f$, where $f$ is the frequency of a signal component of $v_i$ which may be undesirably present in luminance channel 16 of FIG. 1. For instance, f may be the frequency of a signal in the range of frequencies containing the chrominance or sound subcarriers or both. More specifically, $f$ may be the color subcarrier frequency, e.g., 3.58 MHz, or the sound intercarrier frequency, e.g., 4.5 MHz. Further, by way of example, it is assumed that summing circuit 118 is arranged to modify the amplitudes of delayed signals b and c by a weight of 1/2. Summing circuit 120 is arranged to modify the amplitudes of delayed signals a and d by weights of 1/2 and relatively broadband signal $v_b$ by a weight of 1.

In general, it is desirable to space delayed signals a and d apart in time by a predetermined interval $NT/2$, where N is an integer and T is the reciprocal of the frequency $f$. The preferred range of N includes integers between 2 and 5. In the example described above, N was chosen as 3. Other values of N may be useful in other particular applications.

With the values according to the example set forth above, the signals $v_b$, $v_p$, $Pv_p$ and $v_o$ are related to delayed signals a, b, c and d according to the following expressions:

| | | |
|---|---|---|
| $v_b$ | $= \frac{1}{2}(b+c)$ | [1] |
| $v_p$ | $= v_b - \frac{1}{2}(a+d) = \frac{1}{2}(b+c) - \frac{1}{2}(a+d)$ | [2] |
| $Pv_p$ | $= P[\frac{1}{2}(b+c) - \frac{1}{2}(a+d)]$ | [3] |
| $v_o$ | $= v_b + Pv_p = \frac{1}{2}(b+c) + P[\frac{1}{2}(b+c) - \frac{1}{2}(a+d)]$ | [4] |

Figure 3:
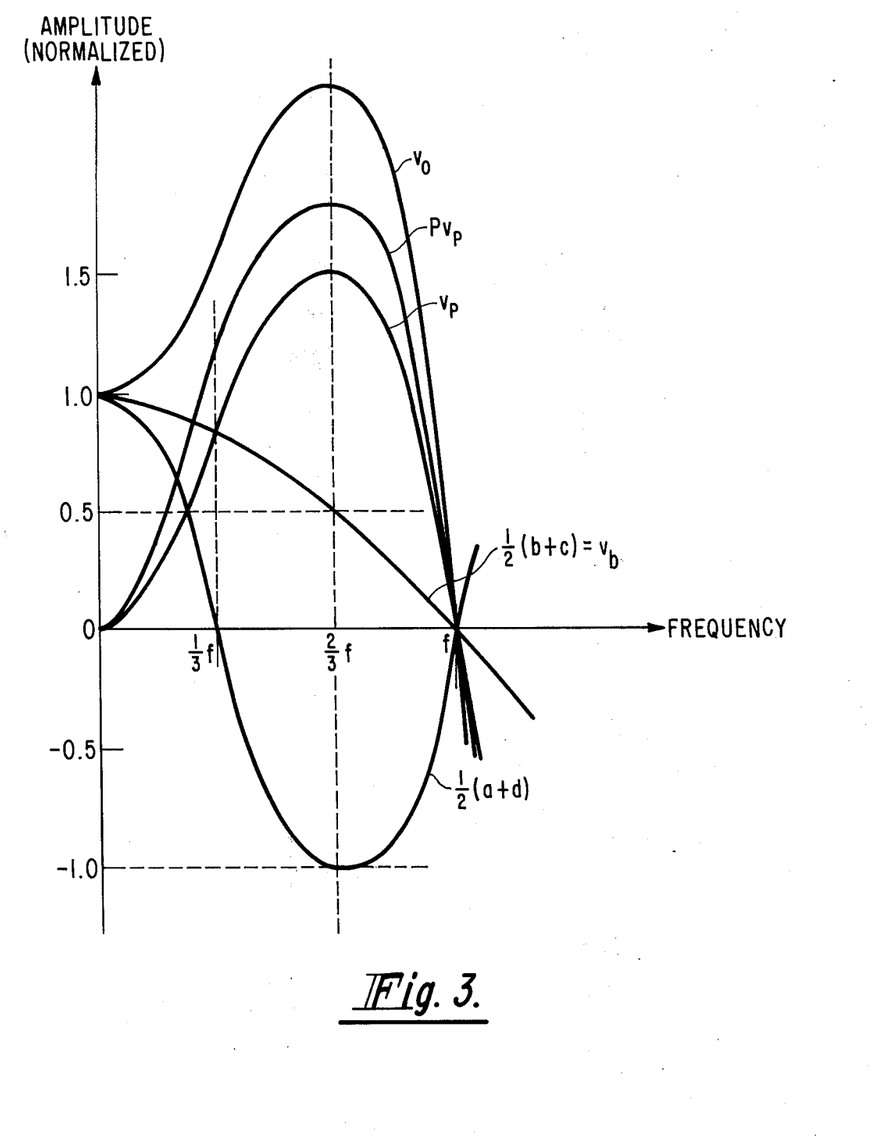
FIG. 3 shows graphical representations of various amplitude versus frequency transfer characteristics associated with the embodiment shown in FIG. 1.

Referring to FIG. 3, there are shown graphical representations of the amplitude versus frequency transfer characteristics associated with the signals $1/2(a+d)$, $v_b$, $PV_p$ and $v_o$. The transfer characteristic associated with $v_b$ is a cosine function having a recurrence rate of 4f while the transfer characteristic associated with $1/2(a+d)$ is a cosine function having a recurrence rate of $4/3f$. In the frequency range extending from DC (i.e., zero frequency) to f, $v_b$ is realtively broadband; the extent of its bandwidth being determined by the time delay between delayed signals b and c. The transfer characteristic associated with $v_p$ is relatively narrowband having an amplitude equal to zero at DC and f and having a peak amplitude at $2/3f$. The location of the peak amplitude of the transfer characteristic associated with $v_p$ is determined by the time delay between delayed signals a and d. The transfer characteristic associated with $v_o$ is relatively accentuated or peaked at $2/3f$ and relatively attenuated at f.

Since the amplitude of the transfer characteristic associated with $v_p$ is zero at DC and f, adjustments of P, while controlling the amplitude of the transfer characteristic in the vicinity of $2/3f$, do not affect the amplitude of the transfer characteristic at DC or at f. This is desirable since the amplitude of $v_o$, formed by the addition of $v_b$ and $Pv_p$ (expression 4) may be adjusted in the vicinity of $2/3f$ without affecting the amplitude (1) of the transfer characteristic at DC or the amplitude (zero) at $f$. This feature is significant since the amplitude of the transfer characteristic at DC, i.e., the DC component of $v_o$, is related to the brightness property of an image reproduced from $v_o$ and the amplitude of the transfer characteristic at f is related to the attenuation of undesired components of $v_o$.

The amplitude transitions of $v_o$ contain both a preshoot and an overshoot (see FIG. 2). These preshoots and overshoots serve to accentuate the tonal transitions in the image formed from $v_o$ because, for example, just prior to a white-to-black transition, the reproduced image will appear whiter than in the original scene while just after the transition, the reproduced image will appear blacker than in the original scene. Furthermore, the phase versus frequency transfer characteristics are related to the preshoots and overshoots. For example, a linear phase versus frequency transfer characteristic corresponds to the formation of equal preshoots and overshoots. The preshoots and overshoots are determined by the signal formed by the summation of delayed signals a and d. Therefore, although the weights of a and d prior to summation in summing circuit 120 were chosen to be equal and time intervals $T_1$ and $T_3$ were chosen to be equal, resulting in a linear phase versus frequency transfer characteristic as manifested by equal preshoots and overshoots, luminance signal processing circuit 22 may be modified to produce unequal preshoots and overshoots to compensate for phase versus frequency non-linearities in other portions of the video signal processing system.

As noted earlier, thresholding circuit 126 of FIG. 1 serves to inhibit amplitude portions $Pv_p$ above or below a predetermined threshold level in order to suppress transient noise. Since thresholding circuit 126 is arranged to operate on high frequency signals in a narrow frequency range relatively free of low frequency components, the operation of thresholding circuit 126 does not affect relatively low frequency components. Therefore, circuit 126 does not unnecessarily introduce objectionable non-linearities in the gray scale of the image associated with relatively low frequency signals.

It is further noted, that if P is inadvertently increased beyond an acceptable limit, thresholding circuit 126 will inhibit the resultant excessive overshoots and preshoots extending beyond a predetermined threshold. Excessive white preshoots or overshoots tend to cause undesirable excessive beam current and associated spot defocussing.

It is also noted that because of the inherent uniformity of the time delay of $v_b$ and $Pv_p$, $v_b$ and $Pv_p$ are in the proper time relationship and of the proper polarity when they are combined to form $v_o$ without the need for additional signal delaying circuitry.

Selection of time intervals $T_1$, $T_2$ and $T_3$ equal to 140 nanoseconds (i.e., one-half the reciprocal of the color subcarrier frequency, 3.58 MHz) is advantageous since the amplitude versus frequency transfer characteristic associated with $v_o$ will then have a peak amplitude at a relatively high frequency near 3.58 MHz, approximately 2/3 × 3.58 MHz (i.e., 2.4 MHz), while providing effective 3.58 MHz trapping. However, other selections of $T_1$, $T_2$ and $T_3$ may also be utilized. For example, it may be desirable to select $T_2$ equal to 110 nanoseconds and $T_1$ and $T_3$ equal to 140 nanoseconds. In this case, the amplitude versus frequency transfer characteristic associated with $v_o$ will have a value substantially zero at approximately 4.1 MHz, while having a peak amplitude at approximately 2/3 × 3.58 MHz (i.e., 2.4 MHz). Thus, the signal processing apparatus of FIG. 1 may be modified so that frequency components in the range of each of the chrominance and sound subcarriers of the video signal are relatively attenuated while relatively high frequency components of the luminance signal may be relatively increased in amplitude.

Figure 4:
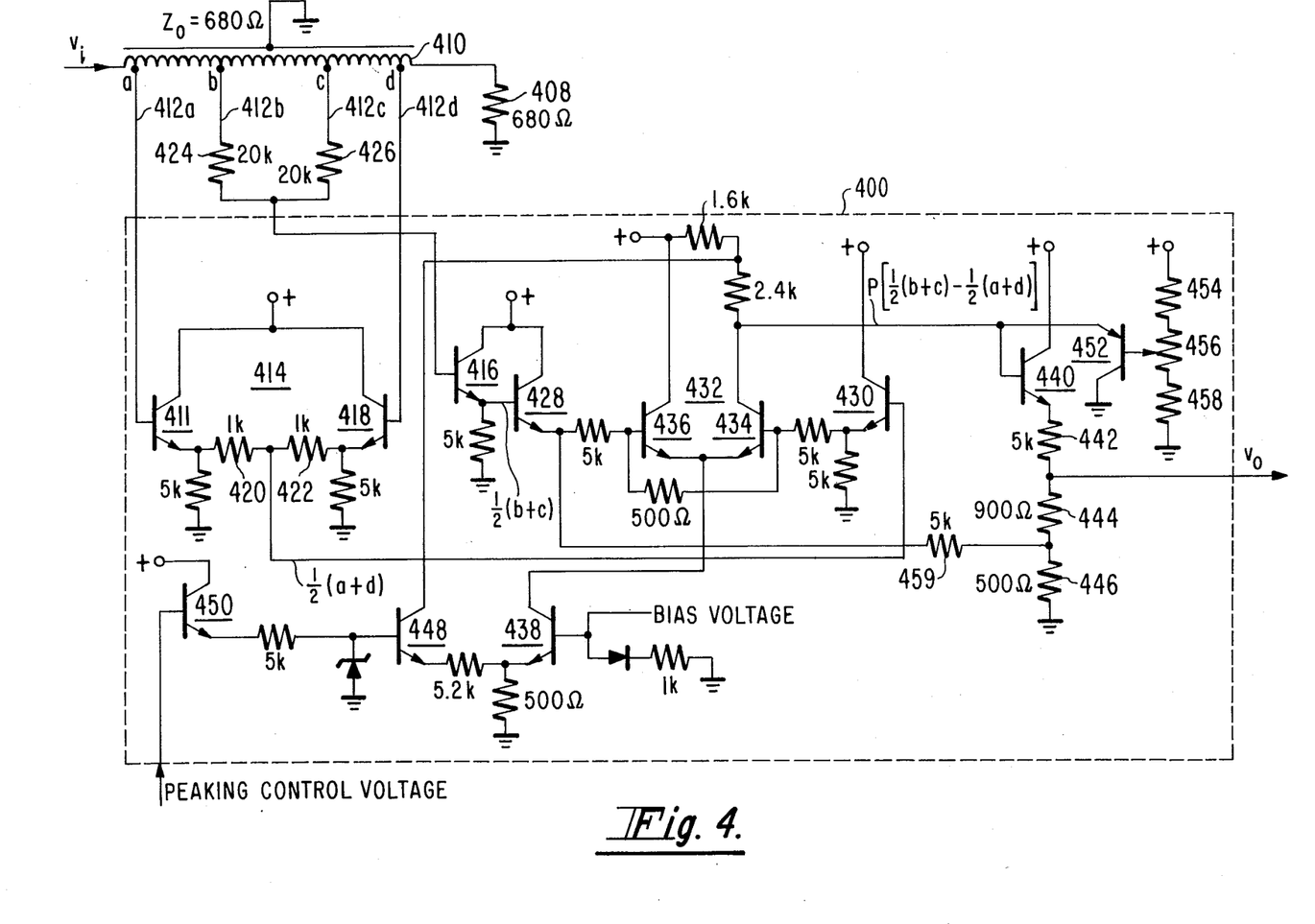
FIG. 4 shows, in schematic form, a circuit arrangement for implementing the embodiment shown in FIG. 1.

In FIG. 4 there is shown an implementation of luminance signal processing unit 22 of FIG. 1, a substantial portion of which (included within dotted line 400) is suitable for construction as an integrated circuit. The circuit shown in FIG. 4, with the resistance values as indicated, is arranged to provide signals consistent with the example used in the description of the operation of the circuit of FIG. 1. It should be appreciated that the circuit of FIG. 4 may be modified to accomodate other applications.

In FIG. 4, delay line 410 is selected to equalize the time delays of signals processed in chrominance channel 14 and luminance channel 16 of FIG. 1. In addition, delay line 410 is arranged to delay input video signal $v_i$ between successive taps 412a, 412b, 412c and 412d by times corresponding to time delay intervals $T_D$, $T_D+T_1$, $T_D+T_1+T_2$ and $T_D+T_1+T_2+T_3$, to develop delayed signals $a$, $b$, $c$ and $d$, respectively. The source of video signals (not shown) typically has an output impedance approximately equal to the characteristic impedance of delay line 410 to minimize signal reflections at the input terminal of delay line 410. Delay line 410 is terminated in impedance 408 whose value is selected approximately equal to the value of the characteristic impedance of delay line 410 to minimize end-of-the-line reflections.

Taps 412a and 412d are respectively coupled to the two inputs of a differential amplifier 414, comprising NPN transistors 411 and 418, where the delayed signals $a$ and $d$ are weighted and arithmetically added to derive $1/2(a+d)$ at the junction of resistors 420 and 422 of differential amplifier 414. The input impedance of differential amplifier 414 is made relatively high compared to the value of the characteristic impedance of delay line 410 by suitable selection of the values of the emitter resistors of transistors 411 and 418.

Taps 412b and 412c are respectively coupled through resistors 424 and 426 to the base of a transistor 416, arranged in a common collector configuration, and comprising, together with resistors 424 and 426, a circuit to weight and algebraically add delayed signals $b$ and $c$. Resistors 424 and 426 are selected to have relatively high values compared to the value of the characteristic impedance of delay line 410 so as not to load delay line 410. The signal developed at the emitter of transistor 416 is equal to $1/2(b+c)$, i.e., $v_b$.

It should be noted that $1/2(b+c)$ may be generated in the same manner as $1/2(a+d)$, but is illustrated as being generated in the summing circuit comprising transistor 416 and resistors 424 and 426 to conserve integrated circuit input terminals.

The signals $1/2(b+c)$ and $1/2(a+d)$ are respectively coupled through emitter follower stages respectively comprising NPN transistors 428 and 430 to the inputs of differential amplifier 432. Differential amplifier 432 comprises NPN transistors 436 and 434, where $1/2(a+d)$ is subtracted from $1/2(b+c)$ to derive $P[1/2(b+c) - 1/2(a+d)]$, i.e., $Pv_p$, at the collector of transistor 434, where P is the gain of differential amplifier 432.

The gain P of differential amplifier 432 may be adjusted by adjusting the voltage at a peaking control terminal of a peaking control circuit comprising NPN transistors 438, 448, 450. This adjustment corresponds to setting the gain of variable gain device 122 of FIG. 1. The peaking control circuit is coupled to the emitter and collector circuits of a transistor 434 in a manner such that the gain of differential amplifier 432 may be adjusted without substantially varying the DC voltage at the output of differential amplifier 432 in response to the peaking control voltage. That is, the current supplied by the collector of transistor 448 is proportioned to keep the DC component of the output signal of differential amplifier 432 substantially constant despite variations of the peaking control voltage.

The output signal, $Pv_p$, of differential amplifier 432 is coupled to the emitter of PNP transistor 452 which comprises, together with variable resistor 456 and resistors 454 and 458, a clipping circuit to remove or clip off portions of $Pv_p$ above a predetermined threshold and thereby suppress transient noise. The predetermined threshold is determined by controlling the position of the wiper arm of variable resistor 456 to establish a voltage at the base of transistor 452. When the amplitude of $Pv_p$ exceeds the voltage at the base of transistor 452 by approximately 0.6 of a volt, the base-emitter junction of transistor 452 conducts. As a result, the amplitude of $Pv_p$ is limited to a value equal to the voltage at the base of transistor 452 plus approximately 0.6 of a volt.

Although the clipping circuit of FIG. 4 is arranged to clip portions of $Pv_p$ above a predetermined threshold in the positive direction, i.e., white noise transients, it should be appreciated that the clipping circuit may be modified to clip black noise transients or both black and white noise transients. It should also be appreciated that other suitable circuits for inhibiting noise transients above a predetermined threshold, such as a noise inverter or spotter circuit, may be employed in place of the clipping circuit. Furthermore, the DC peaking or contrast control voltage, may be coupled to transistor 452 so that the predetermined threshold is controlled in accordance with either such control voltage.

The modified form of $Pv_p$ is coupled to the base of NPN transistor 440, comprising, together with the series connection of resistors 442, 444 and 446, an emitter-follower circuit. The signal $1/2(b+c)$, established at the emitter of NPN transistor 428, is coupled to the junction of resistors 444 and 446 via resistor 459 where it is algebraically added to the modified form of $Pv_p$ to derive the output signal $v_o$.

Figure 5:
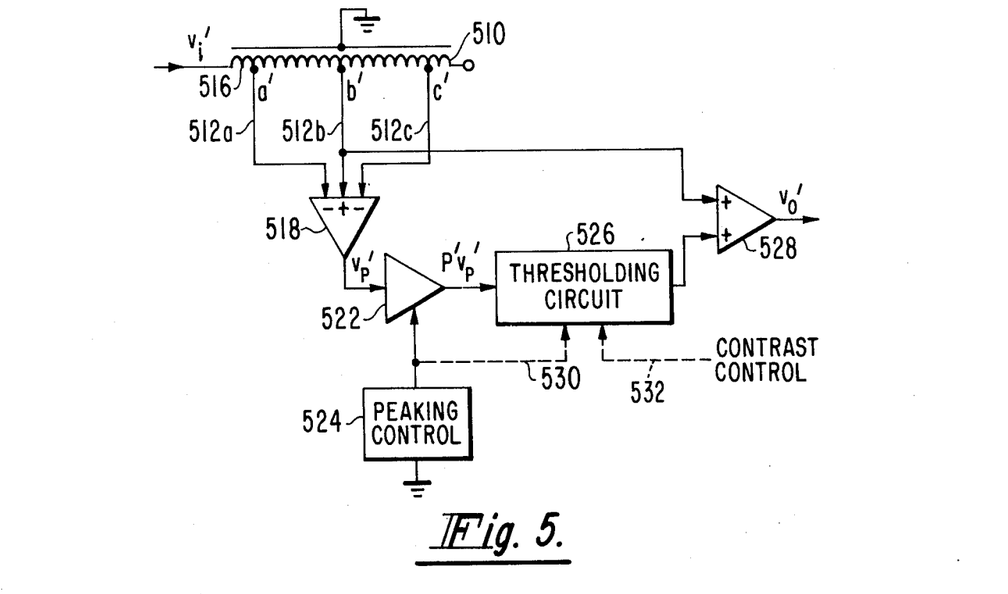
FIG. 5 shows, partially in block diagram form and partially in schematic form, another embodiment of the present invention.

Referring now to FIG. 5, there is shown in block diagram form another embodiment suitable for use in place of luminance signal processing unit 22 of FIG. 1. The embodiment of FIG. 5, it will be noted, is somewhat similar but less complex than luminance signal processing unit 22 of FIG. 1 in that fewer taps of the delay line are utilized in the former.

The luminance signal processing unit of FIG. 5 includes a delay line 510 responsive to an input video signal $v_i'$ and a plurality of terminals or taps 512a, 512b and 512c coupled to delay line 510 at spaced intervals to develop respective delayed signals $a'$, $b'$ and $c'$ delayed in time relation to $v_i'$ by respective time intervals $T_D'$, $T_D'+T_1'$ and $T_D' + T_1' + T_2'$. Delay line 510 includes a portion 516, prior to tap 512a, having a time delay interval $T_D'$, selected with respect to other portions of delay line 510, for equalizing the time delays of the signals processed in the luminance and chrominance channels of the receiver of FIG. 1.

Delayed signals $a'$, $b'$ and $c'$ are coupled to a summing circuit 518 where $a'$ and $c'$ are algebraically subtracted from $b'$ to form a relatively narrowband signal $v_p'$. The output, $v_p'$, of summing circuit 518 is coupled to variable gain device 522 which serves to modify the amplitude of $v_p'$ to form $P'v_p'$, where $P'$ is the gain of device 522, in accordance with a control signal generated by peaking control circuit 524. The output, $P'v_p'$, of variable gain device 522 is coupled to thresholding circuit 526 which serves to inhibit portions of $P'v_p'$ above a predetermined threshold in order to suppress impulse noise. The predetermined threshold of thresholding circuit 526 may be controlled in accordance with the amplitude of $P'v_p'$, as is indicated by dotted line 530, or in accordance with the amplitude of the luminace signal, as is indicated by dotted line 532. The modified form of $P'v_p'$ and $b'$ are coupled to a summing circuit 528 where they are algebraically added to form output signal $v_0'$.

The operation of the luminance signal processing circuit of FIG. 5 will be explained by way of example wherein $T_1'$ and $T_2'$ are selected to be equal to time delays of $1/f'$, where $f'$ is the frequency of a signal component of $v_i'$, such as a chrominance or sound signal subcarrier which may be undesirably present in luminance channel 16 of FIG. 1. Further, by way of example, summing circuit 520 is arranged to weight the components $a'$, $b'$ and $c'$ by respective weights of 1/2, 1 and 1/2 prior to their combination. With these values, $v_p'$, $P'v_p'$ and $v_0'$ are related to delayed signals $a'$, $b'$ and $c'$ according to the following expressions:

| | | |
|---|---|---|
| $v_{p'}$ | $= b' - \frac{1}{2}(a' + c')$ | [5] |
| $Pv_{p'}$ | $= P'[b' - \frac{1}{2}(a' + c')]$ | [6] |
| $v_{o'}$ | $= b' + P'[b' - \frac{1}{2}(a' + c')]$ | [7] |

It is noted that in general, it is desirable to space delayed signals $a'$ and $c'$ apart in time by a predetermined interval $N'T'/2$, where $N'$ is an integer and $T'$ is the reciprocal of the frequency $f'$. The preferred range of $N'$ includes integers between 2 and 5. In the example described above, $N'$ was chosen as 4. Other values of $N'$ may be useful in other particular applications.

Figure 6:
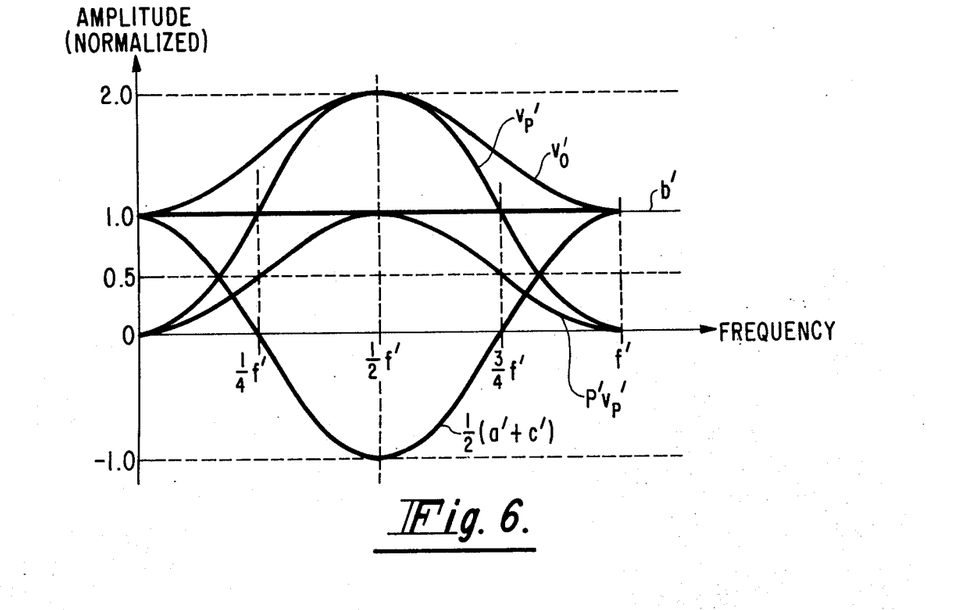
FIG. 6 shows graphical representations of various amplitude versus frequency transfer characteristics associated with the embodiment shown in FIG. 5.

Referring now to FIG. 6, there are shown graphical representations of the amplitude versus frequency transfer characteristics associated with $b'$, $1/2(a'+c')$, $v_p'$, $P'v_p'$ and $v_0'$. The transfer characteristic associated with $b'$ is flat, i.e., relatively broadband. The transfer characteristic associated with $1/2(a'+c')$ is a cosine function having a recurrence rate of $f'$ with a minimum amplitude at integral multiples of $1/2f'$. The transfer characteristics associated with both $v_p'$ and $P'v_p'$ are relatively narrowband having amplitudes of zero at DC and integral multiples of $f'$ and peak amplitudes at integral multiples of $1/2f'$. The transfer characteristic associated with $v_0'$ has a peak amplitude at integral multiples of $1/2f'$ and an amplitude equal to 1 at DC and integral multiples of $f'$. In FIG. 6, by way of example, $P'$ is chosen to have a value of 0.5 with the result that $v_0'$ has a peak amplitude equal to 2.

It is noted that $v_0'$ is relatively accentuated at $1/2f'$ and relatively attenuated at $f'$. Therefore, if $f'$ is chosen equal to the frequency of the color subcarrier, i.e., 3.58 MHz, signals in the vicinity of the color subcarrier (i.e., chrominance signals) will be relatively attenuated while signals in the vicinity of 1.8 MHz (i.e., relatively high frequency luminance signals) will be relatively accentuated or peaked. Since the amplitude at 3.58 MHz is 1 in this example, it may be desirable to provide a filter circuit or trap, either before or after the signal processing circuit of FIG. 5 to further attenuate chrominance signals.

Furthermore, it is noted that the amplitude transitions of $v_0'$ will contain a preshoot and an overshoot which serve to accentuate the amplitude transitions so that an image reproduced from $v_0'$ and containing a white-to-black transition, for example, will be whiter than in the original scene just prior to the transition and blacker than in the original scene just after the transition. These preshoots and overshoots are controlled by delayed signals $a'$ and $c'$. It is also noted that the preshoots and overshoots are related to the phase linearity of the luminance signal processing circuit of FIG. 5. Thus, although delayed signals $a'$ and $c'$ were selected to provide substantially equal preshoots and overshoots, manifesting a linear phase versus frequency transfer characteristic, delayed signals $a'$ and $c'$ may be selected to provide unequal preshoots and overshoots to compensate for phase non-linearities in other portions of the receiver of FIG. 1.

It is further noted that adjustments of P' to control the amplitude of the peaked portion of the transfer characteristic associated with $v_0'$ do not affect the amplitude of the transfer characteristic associated with $v_0'$ at DC or f'. Thus, the brightness property associated with $v_o'$ or the attenuation of undesirable signal portions of $v_o'$ is not affected by adjustments of P'.

It is further noted that since $P'v_p'$ is a relatively narrowband signal occupying a relatively high frequency range, relatively low frequency components are not affected by the amplitude inhibiting operation of thresholding circuit 526 of FIG. 5. Therefore, thresholding circuit 526 will not adversely affect the gray scale of portions of an image reproduced from $v_o$ related to relatively low frequency components of $v_0'$.

It is further noted that thresholding circuit 526 also serves to prevent excessive beam current and associated spot defocussing which may occur in response to excessively large preshoots and overshoots if P' is inadvertently increased beyond an acceptable limit.

Furthermore, it is noted that the relatively broadband signal b' and the modified form relatively narrowband signal $P'v_p'$ provided by the luminance signal processing circuit of FIG. 5 are substantially in time coincidence, with the proper polarity, so that they may be readily combined to form $v_0'$.

It should be appreciated that although the invention has been described with reference to particular embodiments, various additional modifications may be made within the scope of the invention. For example, although the broadband signal and the narrowband signal were provided by respective portions of a transversal filter, other means for providing signals having amplitude versus frequency characteristics similar to those associated with the broadband and narrowband signals may be utilized.

What is claimed is:

1. Apparatus for processing television video signals including:
    a source of television video signals;
    first means coupled to said source of video signals and responsive to said video signals for deriving a first signal including signal components in a frequency range between zero Hertz and a frequency f;
    second means coupled to said source of video signals and responsive to said video signals for deriving a second signal with a narrow bandwidth relative to said first signal, said second means having a peak amplitude response at a frequency between zero Hertz and f and a relatively lower amplitude response at frequencies of zero Hertz and approximately f;
    thresholding means coupled to said second means and responsive to said second signal to inhibit amplitude excursions of said second signal above a predetermined threshold level; and
    output means coupled to said first means and to said thresholding means for combining said amplitude inhibited second signal and said first signal to produce an output signal having relatively accentuated high frequency signal components in accordance with the magnitude of said narrow bandwidth second signal, and relatively suppressed noise components as inhibited by said thresholding means.

2. The apparatus recited in claim 1 wherein said thresholding means includes means for limiting amplitude excursions of said second signal above said predetermined threshold level.

3. The apparatus recited in claim 1 wherein said thresholding means includes means for inverting amplitude excursions of said second signal above said predetermined threshold level.

4. The apparatus recited in claim 1 wherein said first signal and said second signal exhibit substantially equal time delays with reference to said video signal.

5. The apparatus recited in claim 1 wherein said utilization means includes means for controlling the amplitude of said output signal in response to a control signal and wherein said thresholding means includes means responsive to said control signal for controlling said predetermined threshold level.

6. The apparatus recited in claim 1 wherein said second means includes means for controlling said peak amplitude response as a function of a control signal.

7. The apparatus recited in claim 6 wherein said thresholding means includes means responsive to said control signal for controlling said predetermined threshold level.

8. The apparatus recited in claim 1 wherein said second means has a minimum amplitude response at frequencies of zero Hertz and f.

9. The apparatus recited in claim 8 including:
    signal delaying means coupled to said source of video signals, said signal delaying means including a plurality of terminals for providing delayed signals being delayed by different amounts, said delayed signals including at least two delayed signals delayed from one another by a time interval substantially equal to NT/2, where T is the reciprocal of said frequency f and N is an integer;
    combining means coupled to said signal delaying means for providing a first combined signal comprising the sum of at least said two delayed signals;
    said first means being coupled to said signal delaying means for deriving said first signal from at least one other of said delayed video signals, said first signal having an average delay between the delays of the signals comprising said first combined signal; and
    said second means being coupled to said combining means and to said first means for deriving said second signal by combining said first signal with said first combined signal.

10. The apparatus recited in claim 9 wherein said second means provides the difference between said first signal and said first combined signal.

11. The apparatus recited in claim 10 wherein said output means provides the sum of said amplitude inhibited second signal and said first signal.

12. The apparatus recited in claim 11 wherein said first means derives said first signal from a delayed signal spaced in time approximately midway between said two delayed signals.

13. The apparatus recited in claim 11 wherein said terminals provide at least first, second, third and fourth delayed signals;
    said first and fourth delayed signals being coupled to said combining means; and
    said second and third signals being coupled to said first means for summing said second and third delayed signals to derive said first signal.

14. Apparatus included in a television receiver for processing television video signals, said receiver including a luminance channel for processing luminance signals and a chrominance channel for processing chrominance signals comprising:

a source of video signals;

signal delaying means coupled to said source of video signals, said signal delaying means including a plurality of terminals for providing delayed signals, said delayed signals being delayed by different amounts, and including at least two delayed signals delayed from one another by a time interval substantially equal to NT/2, where T is the reciprocal of a frequency f at which it is desired to relatively attenuate said video signals and N is an integer, said signal delaying means including a portion for equalizing time delays of signals processed in said luminance and chrominance channels;

combining means coupled to said signal delaying means for adding said two delayed signals to produce a combined signal;

first means coupled to said signal delaying means for deriving a first signal from at least one other of said delayed signals having a delay between the delays of said two delayed signals;

second means coupled to said combining means and to said first means for subtracting said combined signal from said first signal to produce a second signal having a narrow bandwidth relative to said first signal and characterized by a maximum amplitude response at a frequency between zero Hertz and f and a minimum amplitude response at a frequency of zero Hertz;

third means coupled to said second means for controlling the amplitude response of said second signal to produce an amplitude response controlled second signal;

fourth means coupled to said third means for inhibiting amplitude portions of said amplitude response controlled second signal above a predetermined threshold level; and fifth means coupled to said first and fourth means for adding said amplitude inhibited second signal to said first signal to produce an output signal.

15. Apparatus for use in a television receiver including an image reproducing device, for processing video signals having amplitude transitions, comprising:

transversal equalizer means responsive to said video signals for accentuating relatively high frequency components thereof, said transversal equalizer means including first means for developing a first signal;

second means for developing a second signal having a narrow bandwidth relative to said first signal; and third means responsive to said first and said second signals to produce an output signal having preshoots and overshoots to emphasize said amplitude transitions; and means coupled at least to said second means for attenuating preshoots and overshoots in a white-going direction of amplitude transitions of said video signals to reduce impairment of detail of reproduced images by said white-going amplitude transitions exceeding a predetermined level.

* * * * *